United States Patent [19]

Jones et al.

[11] Patent Number: 5,411,576
[45] Date of Patent: May 2, 1995

[54] OILY MIST RESISTANT ELECTRET FILTER MEDIA AND METHOD FOR FILTERING

[75] Inventors: Marvin E. Jones, Grant Township, Washington County; Alan D. Rousseau, Stillwater, both of Minn.

[73] Assignee: Minnesota Mining and Manufacturing Company, St. Paul, Minn.

[21] Appl. No.: 275,073

[22] Filed: Jul. 13, 1994

Related U.S. Application Data

[63] Continuation of Ser. No. 38,145, Mar. 26, 1993, abandoned.

[51] Int. Cl.$^6$ .................................................. B03C 3/60
[52] U.S. Cl. .......................................... 95/57; 55/527; 55/528; 55/DIG. 39; 95/78; 96/15; 96/66; 307/400
[58] Field of Search .................. 96/15, 17, 55, 66, 96, 96/97; 55/524, 527, 528, DIG. 39; 95/900, 57, 78; 264/22, DIG. 8, DIG. 47; 548/229; 428/328; 524/104, 105; 252/561, 567; 307/400

[56] References Cited

U.S. PATENT DOCUMENTS

| | | | |
|---|---|---|---|
| Re. 30,782 | 10/1981 | van Turnhout | 264/22 |
| Re. 31,285 | 6/1983 | van Turnhout et al. | 55/DIG. 39 |
| 3,487,610 | 1/1970 | Brown et al. | 55/DIG. 39 |
| 3,607,754 | 9/1971 | Asahina et al. | 307/400 X |
| 3,796,778 | 3/1974 | Gallacher | 264/DIG. 8 |
| 3,971,373 | 7/1976 | Braun | 428/328 X |
| 4,100,324 | 7/1978 | Anderson et al. | 428/288 |
| 4,375,718 | 3/1983 | Wadsworth et al. | 55/DIG. 39 |
| 4,429,001 | 1/1984 | Kolpin et al. | 428/283 |
| 4,456,648 | 6/1984 | Adamse et al. | 428/283 |
| 4,560,737 | 12/1985 | Yamamoto et al. | 264/22 X |
| 4,588,537 | 5/1986 | Klasse et al. | 264/22 |
| 4,592,815 | 6/1986 | Nakao | 264/22 X |
| 4,592,949 | 6/1986 | Mizuno et al. | 55/DIG. 45 |
| 4,626,263 | 12/1986 | Inoue et al. | 55/DIG. 39 |
| 4,676,807 | 6/1987 | Miller et al. | 55/527 X |
| 4,874,399 | 10/1989 | Reed et al. | 55/527 X |
| 4,874,659 | 10/1989 | Ando et al. | 55/DIG. 39 |
| 4,945,125 | 7/1990 | Dillon et al. | 264/DIG. 47 |
| 5,025,052 | 6/1991 | Crater et al. | 524/104 |
| 5,057,710 | 10/1991 | Nishiura et al. | 307/400 |
| 5,099,026 | 3/1992 | Crater et al. | 548/229 |
| 5,129,923 | 7/1992 | Hunter et al. | 55/524 X |

FOREIGN PATENT DOCUMENTS

| | | |
|---|---|---|
| 0448883 | 10/0291 | European Pat. Off. . |
| 0488822A2 | 6/1992 | European Pat. Off. . |
| 0488822 | 6/1992 | European Pat. Off. . |
| 271607 | 11/1990 | Japan . |
| 2060259 | 4/1981 | United Kingdom ......... 55/DIG. 39 |
| 165744 | 4/1994 | U.S.S.R. . |

OTHER PUBLICATIONS

Van Wente, A., "Superfine Thermoplastic Fibers," *Industrial Engineering Chemistry*, vol. 48, pp. 1342–1346, Aug. 1956.

Katritzky, Alan R., et al., "Design and Synthesis of Novel Fluorinated Surfactants for Hydrocarbon Subphases," *Langmuir*, vol. 4, pp. 732–735, Jan. 15, 1988.

Van Wente, A., Report No. 4364 of the Naval Research Laboratories, published May 25, 18954, entitled "Manufacture of Super Fine Organic Fibers", May 25, 1954.

Davies, C. N., "The Separation of Airborne Dust and Particles," Institution of Mechanical Engineers, London, Proceedings 1B, 1952.

*Primary Examiner*—Richard L. Chiesa
*Attorney, Agent, or Firm*—Gary L. Griswold; Walter N. Kirn; Carole Truesdale

[57] ABSTRACT

An oily mist resistant electret filter media is provided. The filter media includes polypropylene electret fibers and a melt processable fluorochemical additive. The additive has a melt temperature of at least 25° C. and a molecular weight of about 500 to 2500. Also provided is a method for filtering particulate material from air containing oily aerosol particles.

20 Claims, No Drawings

OILY MIST RESISTANT ELECTRET FILTER MEDIA AND METHOD FOR FILTERING

This is a continuation of application Ser. No. 08/038,145, filed Mar. 26, 1993, now abandoned.

FIELD OF THE INVENTION

The invention concerns electret-enhanced filter media (more simply called "electret filters") made of fibers such as melt-blown microfibers. The invention concerns fibrous electret filters for removing particulate matter from air and improved fibers for making those filters. The invention is especially concerned with respirators and the problem of improving the ability of filter media to accept filtration-enhancing electrostatic charges and to sustain that electret filtration enhancement in the presence of oily aerosols.

DESCRIPTION OF THE RELATED ART

For many years nonwoven fibrous filter webs have been made from polypropylene using melt-blowing apparatus of the type described in Report No. 4364 of the Naval Research Laboratories, published May 25, 1954, entitled "Manufacture of Super Fine Organic Fibers" by Van Wente et al. Such melt-blown microfiber webs continue to be in widespread use for filtering particulate contaminants, e.g., as face masks and as water filters, and for other purposes, e.g., to remove oil from water.

The filtering efficiency of a melt-blown microfiber web can be improved by a factor of two or more when the melt-blown fibers are bombarded as they issue from the orifices with electrically charged particles such as electrons or ions, thus making the fibrous web an electret. Similarly, the web can be made an electret by exposure to a corona after it is collected. Melt-blown polypropylene microfibers are especially useful, while other polymers may also be used such as polycarbonates and polyhalocarbons that may be melt-blown and have appropriate volume-resistivities under expected environmental conditions.

Fibrous filters for removing particulate contaminants from the air are also made from fibrillated polypropylene films. Electret filtration enhancement can be provided by electrostatically charging the film before it is fibrillated.

Common polymers such as polyesters, polycarbonates, etc. can be treated to produce highly charged electrets but these charges are usually short-lived especially under humid conditions. The electret structures may be films or sheets which find applications as the electrostatic element in electro-acoustic devices such as microphones, headphones and speakers and in dust particle control, high voltage electrostatic generators, electrostatic recorders and other applications.

Fibrous polypropylene electret filters that are currently available, some made from melt-blown polypropylene microfibers and others from fibrillated polypropylene film, can show thermally stable electret filtration enhancement.

Unfortunately, fibrous electret filters made of polypropylene, whether melt-blown microfibers or fibrillated film, tend to lose their electret enhanced filtration efficiency faster than desired for some purposes when exposed to oily aerosols. There is a growing awareness of the need to improve the long-term efficiency of air filters in the presence of aerosol oils, especially in respirators. It is known to blend about 1 to 20 weight percent poly(4-methyl-1-pentene) with polypropylene to provide resistance to loss of electret enhanced filtration efficiency on exposure to oily aerosols.

SUMMARY OF THE INVENTION

In one aspect, the present invention provides oily mist resistant electret filter media comprising polypropylene electret fibers and a melt processable fluorochemical additive, said additive having a melting temperature of at least 25° C. and a molecular weight of 500 to 2500. The fibers may be in the form of meltblown microfibers. Preferred fluorochemical additives are fluorochemical oxazolidinones, fluorochemical piperazines or perfluorinated alkanes.

In another aspect, the present invention provides a method for filtering particulate material from air containing oily aerosol particles comprising passing said air through electret filter media comprising polypropylene melt blown microfibers and a melt processable fluorochemical additive.

The electret filter media of the present invention have improved electret filtration enhancement and sustain that enhancement upon exposure to oily aerosols. Furthermore, the electret filter media of the present invention maintain functional filtration enhancing charge levels under accelerated aging conditions.

The novel fibrous electret filter is especially useful as an air filter element of a respirator such as a face mask or for such purposes as heating, ventilation, and air-conditioning. In respirator uses, the novel electret filters may be in the form of molded or folded half-face masks, replaceable cartridges or canisters, or prefilters. In such uses, an air filter element of the invention is surprisingly effective for removing oily aerosols such as in cigarette smoke or in fumes from combustion engines. When used as an air filter, such as in a respirator, the electret filter media has surprisingly better filtration performance than does a comparable electret filter made of 100% polypropylene fibers.

DETAILED DESCRIPTION OF THE INVENTION

The melt blown polypropylene microfibers useful in the present invention can be prepared as described in Van Wente, A., "Superfine Thermoplastic Fibers," *Industrial Engineering Chemistry*, vol. 48, pp. 1342–1346 and in Report No. 4364 of the Naval Research Laboratories, published May 25, 1954, entitled "Manufacture of Super Fine Organic Fibers" by Van Wente et al. or from microfiber webs containing particulate matter such as those disclosed, for example, in U.S. Pat. Nos. 3,971,373 (Braun), 4,100,324 (Anderson) and 4,429,001 (Kolpin et al.), which patents are incorporated herein by reference.

The polypropylene resin used to form the melt blown microfibers should be substantially free from materials such as antistatic agents which could increase the electrical conductivity or otherwise interfere with the ability of the fibers to accept and hold electrostatic charges.

Blown microfibers for fibrous electret filters of the invention typically have an effective fiber diameter of from about 5 to 30 micrometers preferably from about 7 to 10 micrometers, as calculated according to the method set forth in Davies, C. N., "The Separation of Airborne Dust and Particles," Institution of Mechanical Engineers, London, Proceedings 1B, 1952.

The fluorochemical additives useful in the present invention are fluorochemical compounds which can provide oil and water repellency to fibers. The fluorochemical additives must be melt processable, i.e., suffer substantially no degradation under the melt processing conditions used to form the microfibers. The fluorochemical additive is solid at 25° C. and preferably has a melting point of at least about 70° C., more preferably at least about 100° C. The fluorochemical additive preferably exhibits no phase transitions in the range of commonly encountered temperatures, i.e., about 0° C. to 80° C. as such changes in molecular freedom can adversely affect charge stability. The fluorochemical additive preferably has a molecular weight in the range of about 500 to 2500, more preferably in the range of about 800 to 1500. The fluorochemical additive is preferably substantially free from mobile polar and/or ionic species, contaminants and impurities which could increase the electrical conductivity or otherwise interfere with the ability of the fibers to accept and hold electrostatic charges.

Preferred fluorochemical additives include, for example, fluorochemical oxazolidinones which are described in U.S. Pat. No. 5,025,052 (Crater et al.), fluorochemical piperazines which are described in Katritzky, Alan R. et al., "Design and Synthesis of Novel Fluorinated Surfactants for Hydrocarbon Subphases," Langmuir, vol. 4, pp. 732–735, 1988, and perfluorinated alkanes preferably having about 10 to 50 carbon atoms, more preferably about 15 to 30 carbon atoms. The fluorochemical additive is preferably present in amounts of about 0.2 to 10 weight percent, more preferably about 0.5 to 5 weight percent, most preferably about 0.5 to 2 weight percent.

Preferably, the filter media is annealed, i.e., heated for a sufficient time at a sufficient temperature to cause the fluorochemical additive to bloom to the surface of the fibers. Generally, about 1 to 10 minutes at about 140° C. is sufficient although shorter times may be used at higher temperatures and longer times may be required at lower temperatures.

The electret filter media of the present invention preferably has a basis weight in the range of about 10 to 500 g/m$^2$, more preferably about 10 to 100 g/m$^2$. In making melt-blown microfiber webs, the basis weight can be controlled, for example, by changing either the collector speed or the die throughput. The thickness of the filter media is preferably about 0.25 to 20 mm, more preferably about 0.5 to 2 mm. The electret filter media and the polypropylene resin from which it is produced should not be subjected to any unnecessary treatment which might increase its electrical conductivity, e.g., exposure to gamma rays, ultraviolet irradiation, pyrolysis, oxidation, etc.

The melt-blown microfibers or fibrillated fibers of the electret filters of the invention can be electrostatically charged by a process described in U.S. Pat. Nos. Re. 30,782 (van Turnhout) or Re. 31,285 (van Turnhout) or by other conventional methods for charging or polarizing electrets, e.g., by a process of U.S. Pat. Nos. 4,375,718 (Wadsworth et al.); 4,588,537 (Klasse et al.); or 4,592,815 (Nakao). In general, the charging process involves subjecting the material to corona discharge or pulsed high voltage.

In the following examples, all percentages and parts are by weight unless otherwise noted. The fluorochemical additives used in the examples were as follows:

Additive A

A fluorochemical oxazolidinone was prepared following the procedure of Example 5 of U.S. Pat. No. 5,099,026 which is incorporated herein by reference. The solid product was ground to form a powder and one part was added to four parts refluxing solvent of 95% ethanol and 5% water and refluxed for about ten minutes. The resulting slurry was cooled and the solid filtered and dried at 71° C. The resulting solid had a melting point of 197° C. as determined by DSC. The structure is set forth in Table I.

Additive B

Additive B was prepared using the procedure used for Additive A except the isocyanate used was p-xylene diisocyanate. The resulting solid product had a melting point of 220° C. as determined by DSC. The structure is set forth in Table I.

Additive C

A fluorochemical oxazolidinone was prepared following the procedure of Example 1 of U.S. Pat. No. 5,099,026. One part of the solid product was dissolved in five parts dimethyl formamide at about 100° C. and the resulting solution was allowed to cool. The solid which formed was isolated by filtration and added to 16 times its weight of refluxing ethyl acetate. After cooling, the resulting solid was isolated by filtration and dried. The resulting solid product had a melting point of 169° C. as determined by DSC. The structure is set forth in Table I.

Additive D

Additive D was prepared using the procedure used for Additive A except the isocyanate used was octadecyl isocyanate. The product was recrystallized from ethyl acetate four times. The resulting solid product had a melting point of 145° C. as determined by DSC. The structure is set forth in Table I.

Additive E

To a 500 mL three-neck flask fitted with a thermometer, drying tube and overhead stirrer were added isophorone diisocyanate (148.7 g, 0.669 mol) and 4 drops dibutyl tin dilaurate. The reaction mixture was stirred and pentaerythritol (22.7 g, 0.167 mol) was added. The reaction mixture was heated to about 78° C. and the reaction was carried out for about 20 hours during which time the viscosity of the reaction mixture increased. Ethyl acetate (148 mL) was added to the reaction mixture in portions to reduce the viscosity of the material. A condenser was fitted to the flask. Heating was discontinued when titration with n-butyl amine indicated that about 50% of the isocyanate had reacted. The final concentration of the resulting polyfunctional isocyanate intermediate was about 50% in ethyl acetate.

Additive E was then prepared using the procedure used for Additive A except the isocyanate used was the polyfunctional isocyanate intermediate prepared above. The reaction product was difficult to filter. Filter cakes of the product swollen with ethyl acetate were added to a solution of 70% acetone and 30% water. A white solid rapidly settled out and was isolated by filtration. The product was dried at 71° C. The resulting solid had a melting point of 182° C. as determined by DSC. The structure is set forth in Table I.

Additive F

Additive F was prepared by adding to a 3-neck round bottom 500 ml flask equipped with a nitrogen inlet and a magnetic stirrer N-(perfluorooctylsulfonyl)-piperazine (34.1 g, 60 mmol), triethylamine (6.7 g, 66 mmol) and chloroform (200 mL) and the mixture was stirred. Phthaloyl dichloride (95%, 6.4 g, 30 mmol) was added dropwise as a chloroform solution. After the addition was complete, the reaction mixture was stirred under nitrogen atmosphere for 30 minutes. The reaction product was washed with deionized water several times. The solid was allowed to air dry and then was oven dried at 105° C. for three hours. The solid product was ground to form a powder and one part was added to four parts refluxing solvent of 95% ethanol and 5% water and refluxed for about ten minutes. The resulting solid product was dried at 71° C. The product had a melting point of 191° C. The structure was confirmed by NMR. The structure is set forth in Table I.

Additive G

Additive G was $C_{24}F_{50}$, available from Aldrich Chemical Co., melting point 188°–190° C.

Additive H

To polypropylene resin (ESCORENE PP-3085, available from Exxon Corp.) was added about 6–7% n-methylperfluorooctylsulfonamidoethyl acrylate and peroxide initiators (0.01 mole percent LUPERSOL 101 and 0.01 mole percent LUPERSOL 130, available from Pennwalt Chemical Co.). A reaction was carried out in a corotating twin screw extruder to graft the n-methyl-perfluorooctylsulfonamidoethyl acrylate to the polypropylene. The reaction temperature was 220° C. and residence time was 6 minutes.

Additive I

N-methyl-perfluorooctanesulfonamide (450 g) was placed in a two-liter, three-necked, round bottom flask and heated to 80° C. Epichlorohydrin (101 g) was then added, followed by addition of methanol (91 g). The temperature was reduced to 65° C. and sodium methoxide (30 g, 25% in methanol) was slowly added while the temperature was maintained below 70° C. Then sodium hydroxide (60 g, 50% aqueous solution) was slowly added with the temperature maintained below 70° C. The resulting reaction was stirred overnight at 65° C. Vacuum was then applied to remove excess methanol and epichlorohydrin. The resulting product, N-methyl-N-glycidyl-perfluorooctanesulfonamide, was then washed twice with water (450 g) at 65° C. Vacuum (20 mm Hg) was applied and the temperature raised to 90° C. to remove any volatile materials.

N-methyl-N-glycidyl-perfluorooctanesulfonamide, (250 g, 0.44 mol) and toluene (250 g) were placed in a one-liter, three-necked, round bottom flask equipped with a stirrer, condenser, gas inlet tube, thermometer and electric heating mantle under a nitrogen atmosphere. The solution was stirred, heated to 60° C. and then octadecylamine (118.4 g, 0.44 mol) was added in small portions over 15 minutes. The temperature was then raised to 115° C. and the mixture was stirred for 12 hours until gas chromatographic analysis confirmed the epoxide groups had been converted to aminoalcohol groups. The reaction mixture was cooled to 25° C. and excess toluene was removed under vacuum with a rotary evaporator. The resulting material was recrystallized from a solution of 5 parts water and 95 parts ethyl alcohol and had a melting point of 63° C. as determined by DSC analysis.

Additive J

Additive J is FS-1265 Fluid, a trimethyl terminated trifluoropropylmethyl polysiloxane, viscosity 10,000 CST available from Dow Corning Corp.

TABLE I

| Additive | Structure |
|---|---|
| A | $C_8F_{17}SO_2N(CH_3)CH_2-CH-CH_2$ (oxazolidinone ring) $N-(CH_2)_6-N$ (oxazolidinone ring) $CH_2-CH-CH_2N(CH_3)SO_2C_8F_{17}$ |
| B | $C_8F_{17}SO_2N(CH_3)CH_2-CH-CH_2$ (oxazolidinone ring) $N-CH_2$—(phenylene)—$CH_2-N$ (oxazolidinone ring) $CH_2-CH-CH_2OC_8H_{17}$ |
| C | $C_8F_{17}SO_2N(CH_3)CH_2-CH-CH_2$ (oxazolidinone ring) $N-CH_2$—(phenylene)—$CH_2-N$ (oxazolidinone ring) $CH_2-CH-CH_2N(CH_3)SO_2C_8F_{17}$ |
| D | $C_8F_{17}SO_2N(CH_3)CH_2-CH-CH_2$ (oxazolidinone ring) $N-C_{18}H_{37}$ |
| E | $[C-CH_2OCONH-CH_2-\text{(trimethylcyclohexyl with } CH_3, CH_3, CH_3\text{)}-N$ (oxazolidinone ring) $CH_2-CH-CH_2N(CH_3)SO_2C_8F_{17}]_4$ |

TABLE I-continued

| Additive | Structure |
|---|---|
| F | $C_8F_{17}SO_2N$⟨ ⟩$NCO$—⟨benzene⟩—$CON$⟨ ⟩$NSO_2C_8F_{17}$ |
| I | $C_8F_{17}SO_2N(CH_3)CH_2CH(OH)CHNHC_{18}H_{37}$ |

EXAMPLE 1

In Example 1, polypropylene (99%, ESCORENE PP-3505, available from Exxon Corporation) and Additive A (1%) were dry blended and extruded as described in Van Wente, A., "Superfine Thermoplastic Fibers," *Industrial Engineering Chemistry*, vol. 48, pp. 1342–1346 at a melt temperature of 297° C. to form melt blown microfiber web having a basis weight of 54 g/m² and a thickness of 0.79 mm. The web was annealed at 140° C. for 10 minutes and then corona charged using a high voltage electric field provided between a corona source and a ground electrode with a corona current of about 0.01 milliamp per centimeter of corona source. Examples 2–7 and Comparative Examples C1–C4

In Examples 2–7 and Comparative Examples C1–C3 webs were prepared using the procedure of Example 1. Comparative Example C4 contained no additive. The additive, amount of additive, melt temperature, basis weight, thickness and ΔP are set forth in Table II. The ΔP was measured with a flow rate of 32 L/min at a face velocity of 5.2 cm/sec.

TABLE II

| Ex. | Additive | Additive Amount (%) | Melt Temp. (°C.) | Basis Weight (g/m²) | Thickness (mm) | Δp (mmH₂O) |
|---|---|---|---|---|---|---|
| 1 | A | 1 | 297 | 54 | 0.79 | 1.2 |
| 2 | B | 1 | 297 | 54 | 0.74 | 1.2 |
| 3 | C | 1 | 307 | 54 | 0.99 | 1.7 |
| 4 | D | 1 | 303 | 50 | — | 1.5 |
| 5 | E | 1 | 280 | 57 | 0.94 | 1.2 |
| 6 | F | 1 | 307 | 52 | 1.45 | 2.1 |
| 7 | G | 1 | 307 | 53 | 1.22 | 1.1 |
| C1 | H | 20 | 282 | 55 | 0.94 | 1.7 |
| C2 | I | 1 | 287 | 54 | 0.99 | 1.5 |
| C3 | J | 1 | 287 | 54 | 0.91 | 1.6 |
| C4 | — | — | 301 | 54 | 0.69 | 1.4 |

The samples were then tested using the following tests:

DOP Penetration and Pressure Drop

Dioctyl phthalate (DOP) 0.3 micrometer diameter particles at a concentration of between 70 and 110 mg/m³ are generated using a TSI No. 212 sprayer with four orifices and 30 psi clean air. The particles are forced through a sample of filter media which is 4.5 inches in diameter at a rate of 42.5 L/min. at a face velocity of 6.9 centimeters per second. The sample was exposed to the aerosol for 30 to 60 seconds until the readings stabilized. The penetration is measured with an optical scattering chamber, Percent Penetration Meter Model TPA-8F available from Air Techniques Inc. The DOP penetration is preferably less than about 40%, more preferably less than about 25%. The pressure drop is measured at a flow rate of 42.5 L/min and a face velocity of 6.9 cm/sec using an electronic manometer. Pressure drop is reported as ΔP in mm of water. Preferably the pressure drop is less than about 4, more preferably less than about 3.

The penetration and pressure drop are used to calculate a quality value "QF value" from the natural log (ln) of the DOP penetration by the following formula:

$$QF\ [1/\text{mm H}_2\text{O}] = \frac{-\text{Ln}\left[\frac{\text{DOP Penetration (\%)}}{100}\right]}{\text{Pressure Drop [mm H}_2\text{O]}}$$

A higher initial QF value indicates better initial filtration performance. Decreased QF values effectively correlate with decreased filtration performance. Generally a QF value of at least about 0.25 is preferred, a value of at least about 0.4 is more preferred and a value of at least about 0.5 is most preferred. The filter media are preferably thermally stable, i.e., show no more than 30% loss in QF value after three days storage at 60° C.

DOP Loading Test

For the DOP Loading Test, the same test equipment was used as in the penetration and pressure drop tests. The test sample was weighed and then exposed to the DOP aerosol for 45 min. to provide an exposure of between 130 and 200 mg. DOP penetration and pressure drop are measured throughout the test at least as frequently as once per minute. The mass of DOP collected divided by the mass of sample exposed was calculated for each measurement interval from the measured penetration, mass of the filter web and total mass of DOP collected on the filter web during exposure.

DOP penetration, pressure drop and loading tests were performed after about three days storage at ambient conditions after charging. The initial DOP penetration and pressure drop were measured after one minute exposure to allow the system to equilibrate. The DOP penetration and pressure drop results are also interpolated to 50 and 100 mg exposure. The results are set forth in Table III.

TABLE III

| | Initial | | | 50 mg | | 100 mg | |
|---|---|---|---|---|---|---|---|
| Ex. | PEN | ΔP | QF | PEN | ΔP | PEN | ΔP |
| 1 | 29 | 1.8 | 0.70 | 35 | 2.0 | 38 | 2.1 |
| 2 | 29 | 1.8 | 0.71 | 33 | 2.0 | 35 | 2.1 |
| 3 | 21 | 2.3 | 0.66 | 24 | 2.6 | 26 | 2.8 |
| 4 | 15 | 2.2 | 0.87 | 23 | 2.3 | 33 | 2.4 |
| 5 | 32 | 1.7 | 0.67 | 36 | 1.9 | 41 | 2.0 |
| 6 | 11 | 4.1 | 0.54 | 22 | 4.3 | 40 | 4.3 |
| 7 | 37 | 1.7 | 0.58 | 55 | 1.8 | 64 | 1.8 |
| C1 | 78 | 2.4 | 0.10 | — | — | — | — |
| C2 | 40 | 2.2 | 0.41 | 38 | 2.4 | 48 | 2.5 |
| C3 | 34 | 2.5 | 0.43 | 78 | 2.5 | 81 | 2.6 |
| C4 | 41 | 1.9 | 0.47 | 77 | 1.9 | 81 | 1.9 |

Samples were aged at elevated temperature and again tested. The test results for the aged samples are set forth in Table IV.

TABLE IV

| Ex. | Aging Temp. (°C.) | Aging Time (hrs) | Initial Pen | Initial ΔP | Initial QF | 50 mg Pen | 50 mg ΔP | 100 mg Pen | 100 mg ΔP | 100 mg QF |
|---|---|---|---|---|---|---|---|---|---|---|
| 1  | 60 | 72 | 30 | 1.8 | 0.67 | 32 | 2.0 | 32 | 2.2 | 0.52 |
| 2  | 60 | 72 | 27 | 1.8 | 0.73 | 29 | 2.0 | 30 | 2.2 | 0.55 |
| 3  | 60 | 73 | 38 | 2.1 | 0.45 | 35 | 2.3 | 33 | 2.5 | 0.44 |
| 4  | 60 | 47 | 20 | 2.2 | 0.72 | 22 | 2.4 | 29 | 2.4 | 0.52 |
| 5  | 70 | 70 | 38 | 1.7 | 0.57 | 39 | 1.9 | 40 | 2.0 | 0.46 |
| 6  | 60 | 73 | 17 | 3.6 | 0.48 | 24 | 3.8 | 34 | 3.9 | 0.28 |
| 7  | 60 | 73 | 38 | 1.6 | 0.61 | 44 | 1.7 | 57 | 1.7 | 0.33 |
| C1 | 60 | 24 | 83 | 2.4 | 0.08 | —  | —  | —  | —  |      |
| C2 | 70 | 72 | 83 | 2.1 | 0.09 | 81 | 2.1 | 83 | 2.2 | 0.08 |
| C3 | 70 | 48 | 50 | 2.3 | 0.30 | 77 | 2.3 | 79 | 2.4 | 0.10 |
| C4 | 60 | 72 | 35 | 1.8 | 0.57 | 66 | 1.9 | 76 | 1.9 | 0.14 |

As can be seen from the data in Tables III and IV, addition of an appropriate melt processable fluorochemical additive to polypropylene enhances the resistance of the filter media to damage by an oily aerosol. In Examples 1-7, each of the materials tested had QF values of at least 0.5 on initial testing. In the loading test, Examples 1-6 had penetrations less than 50% even after exposure to 100 mg DOP. Although Example 7 had a penetration in excess of 50% at 100 mg DOP exposure, performance was adequate. The filter media of Comparative Example C1 did not retain charge, possibly due to the reaction byproducts in the grafting process or the presence of polar groups. Subsequent to aging, each of Examples 1-7 exhibit a QF value greater than 0.4 and each of Examples 1-6 have penetrations lower than 50% after 100 mg DOP exposure. Comparative Example C2 did not retain charge after elevated temperature aging, possibly due to the low melting point of the fluorochemical additive and the presence of polar groups in the molecule.

Comparative Examples C5-C7

Samples were prepared as in Example 1 except in Comparative Example C5 the web was not charged, in Comparative Example C6 the web was not annealed, and in Comparative Example C7 the web contained no additive, was annealed and charged. The webs were tested as were the webs of Examples 1-7. The results are set forth in Table V together with the results of Example 1 tests for comparison.

TABLE V

| Ex. | Initial PEN | Initial ΔP | Initial QF | 50 mg PEN | 50 mg ΔP | 100 mg PEN | 100 mg ΔP |
|---|---|---|---|---|---|---|---|
| 1  | 29 | 1.8 | 0.70 | 35 | 2.0 | 38 | 2.1 |
| C5 | 84 | 1.9 | 0.09 | 81 | 2.0 | 79 | 2.0 |
| C6 | 30 | 2.1 | 0.58 | 69 | 2.1 | 81 | 2.1 |
| C7 | 41 | 1.9 | 0.47 | 77 | 1.9 | 81 | 1.9 |

As can be seen from the results in Table V, the fluorochemical additive, the annealing and the charging are each important in the practice of the present invention.

Examples 8-10 and Comparative Example C8

In Examples 8-10, samples were prepared as in Example 1 using 0.5, 1 and 2 weight percent, respectively of Additive A. In Comparative Example C8 no additive was used. The samples were stored at 70° C. for 72 hours. Testing was carried out as in the previous examples. The results are set forth in Table VI.

TABLE VI

| Ex. | Initial PEN | Initial ΔP | Initial QF | 50 mg PEN | 50 mg ΔP | 100 mg PEN | 100 mg ΔP |
|---|---|---|---|---|---|---|---|
| C8 | 44 | 2.2 | 0.4 | 70 | 2.1 | 83 | 2.3 |
| 8  | 30 | 2.3 | 0.5 | 32 | 2.5 | 38 | 2.6 |
| 9  | 31 | 2.1 | 0.6 | 28 | 2.4 | 27 | 2.6 |
| 10 | 39 | 1.7 | 0.5 | 39 | 1.9 | 37 | 2.1 |

As can be seen from the data in Table VI, at addition levels of only 0.5 weight percent, Additive A provides improved performance.

Various modifications and alterations of this invention will be apparent to those skilled in the art without departing from the scope and spirit of this invention and this invention should not be restricted to that set forth herein for illustrative purposes.

What is claimed is:

1. An oily mist resistant electret filter media comprising melt blown polypropylene electret microfibers and a melt processable fluorochemical additive compound having a melting point of at least about 25° C. and a molecular weight of about 500 to 2500 present in an amount of about 0.2 to 10 weight percent to achieve sustained electret filtration enhancement.

2. The filter media of claim 1 wherein the fluorochemical additive is a fluorochemical oxazolidinone, fluorochemical piperazine or perfluorinated alkane.

3. The filter media of claim 1 wherein said additive has a molecular weight of about 800 to 1500.

4. The filter media of claim 1 wherein said additive has a melting point of at least about 70° C.

5. The filter media of claim 1 wherein said additive is substantially free of mobile polar species.

6. The filter media of claim 1 wherein said additive is substantially free of mobile ionic species.

7. The filter media of claim 1 wherein said microfibers have an effective fiber diameter of about 5 to 30 micrometers.

8. The filter media of claim 1 wherein said fibers are melt blown microfibers.

9. The filter media of claim 1 wherein said media has a basis weight of 10 to 100 g/m$^2$.

10. The filter media of claim 1 wherein said media has a thickness of about 0.25 to 20 mm.

11. A method for filtering particulate material from air containing oily aerosol particles comprising passing said air through electret filter media comprising polypropylene melt blown microfibers and a melt processable fluorochemical additive, said additive having a melting point of at least 25° C. and a molecular weight of about 500 to 2500 present in an amount of about 0.2 to 10 weight percent to achieve sustained electret filtration enhancement.

12. The method of claim 11 wherein the fluorochemical additive is a fluorochemical oxazolidinone, fluorochemical piperazine, or perfluorinated alkane.

13. The method of claim 11 wherein said additive has a molecular weight of about 800 to 1500.

14. The method of claim 11 wherein said additive has a melting point of at least about 70° C.

15. The method of claim 11 wherein said additive is substantially free of mobile polar species.

16. The method of claim 11 wherein said additive is substantially free of mobile ionic species.

17. The method of claim 11 wherein said microfibers have an effective fiber diameter of about 5 to 30 micrometers.

18. The method of claim 11 wherein said fibers are melt blown microfibers.

19. The method of claim 11 wherein said media has a basis weight of 10 to 100 g/m$^2$.

20. The method of claim 11 wherein said media has a thickness of about 0.25 to 20 mm.

* * * * *